(No Model.)
G. LANGBEIN.
CARRIAGE SPRING.
No. 409,688. Patented Aug. 27, 1889.
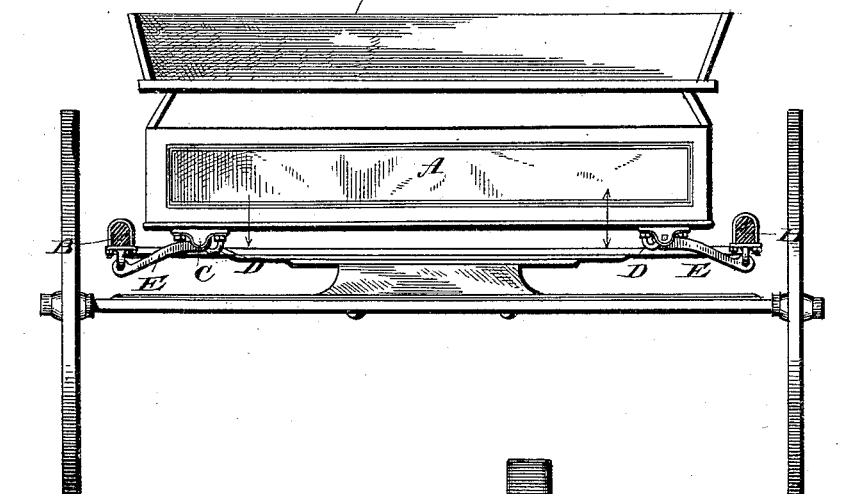
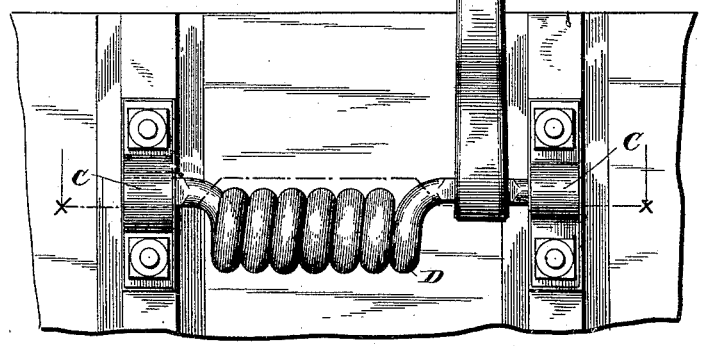
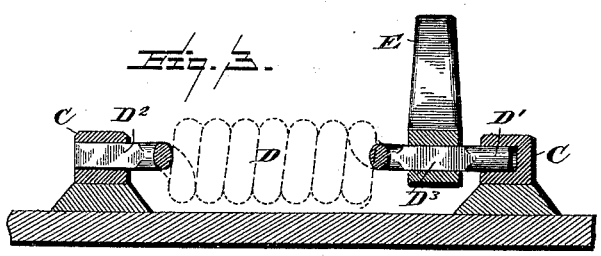
Witnesses
L. C. Hills.
H. Sutherland.
Inventor
George Langbein
E. B. Stocking
Attorney

UNITED STATES PATENT OFFICE.

GEORGE LANGBEIN, OF OMAHA, NEBRASKA.

CARRIAGE-SPRING.

SPECIFICATION forming part of Letters Patent No. 409,688, dated August 27, 1889.

Application filed April 12, 1889. Serial No. 307,004. (No model.)

*To all whom it may concern:*

Be it known that I, GEORGE LANGBEIN, a citizen of the United States, residing at Omaha, in the county of Douglas, State of Nebraska, have invented certain new and useful Improvements in Carriage-Springs, of which the following is a specification, reference being had therein to the accompanying drawings.

The object of my invention is to provide an easy carriage-spring, which shall take up as small a space as possible, shall be easily affixed to any side-bar vehicle, and shall be easily replaced by a man of ordinary skill. To this end I have constructed my spring as hereinafter described, and with such novel features as will be particularly pointed out in the claims at the end of the specification.

In the drawings, Figure 1 is a front elevation of a side-bar vehicle provided with my improved spring, showing the mode of attachment of the latter. Fig. 2 is a bottom plan of my spring as attached beneath any vehicle. Fig. 3 is a vertical section on the broken line $x\ x$ of Fig. 2.

A is the body of any side-bar vehicle, of which B is a side bar on each side of the same. These side bars are of any well-known construction and extend along the side of the vehicle.

As is seen in Fig. 1, my spring is attached at one end to the under side of the carriage, while the other end is attached in any convenient and well-known manner to the side bar on that side of the vehicle at which it is placed.

The construction of my spring and its mode of attachment to the under side of the vehicle is shown in detail in Figs. 2 and 3.

C are brackets, which are fastened under the wagon in any way, but preferably, as shown, by bolting to the bottom. These brackets serve as bearings for the ends of spiral spring D, which should be of considerable rigidity in order that it may support the corner of the wagon under which it is placed.

As shown in Fig. 3 in section, one of the brackets C is preferably provided with a socket of the form shown, into which the rounded end of the spring at D' is inserted in order to allow of the free turning of the same therein. The other bracket is preferably provided with a polygonal (in this case square) perforation, through which the other end of the spring is projected, said end being polygonal for the tight fitting into said perforation, in order that the said end of the spring may not turn in said bracket.

Near the rounded end of the spring there is a polygonal section of the wire composing the spring, as shown at $D^3$, which is preferably square, as shown, although it may be made of any non-circular shape. Over this section of the wire the end of the lever E is placed, as shown in Figs. 2 and 3. This end is provided with a slot fitting tightly over the polygonal section $D^3$, as shown in the figures, and this is preferably placed by the shrinking operation well known in the application of tires to wheels. This end, however, may be attached to the wire of the spring by any means desired, and I do not wish to be limited to this means of attachment.

The lever E, as shown in Fig. 1, is that the other end of which is attached to the side bar of the wagon, either by an eye, as shown, or by any other means which will allow free play of the same, such as is required by this kind of spring.

It is evident that this device will provide a spring which will support its proper corner of the wagon and which will be easily placed and detached.

I do not wish to be understood as limiting myself to the exact details as shown and described, as there are various details of the same which may be varied by the exercise of mechanical skill without departing from the spirit of my invention.

What I claim is—

1. A carriage-spring composed of two brackets secured beneath the body of a carriage, and a spiral spring turning in one of said brackets and provided with a square head at the other end and fitted into a square hole in the bracket on that side, substantially as described.

2. A carriage-spring composed of two brackets secured beneath the body of the carriage, and a spiral spring turning in one of said brackets and provided with a polygonal head at the other end fitted into a polygonal hole in the bracket on that side, substantially as described.

3. The brackets secured beneath the body of a carriage, one of said brackets having a polygonal bearing and the other having a round bearing, a spring coiled as described, having one end adapted to fit said angular bearing and the other end turning loosely in said round hole, in combination with a lever attached to said spring and adapted to be fastened to the side bar of the carriage, substantially as described.

4. A bracket having a polygonal bearing, a bracket having a round bearing, a spiral spring having a straight portion and having one end of the same squared for fitting into said polygonal bearing, and the other at the end of said straight portion adapted to turn in said round bearing, a portion of said straight portion being polygonal, in combination with a lever provided with a grip adapted to fit over said polygonal portion of the spring and adapted to be fastened to the side bar of the carriage, substantially as described.

In testimony whereof I affix my signature in presence of two witnesses.

GEORGE LANGBEIN.

Witnesses:
HARRY EVANS,
WILLIAM PFEIFFER.